(12) United States Patent
Okazawa

(10) Patent No.: US 10,509,611 B2
(45) Date of Patent: Dec. 17, 2019

(54) PRINT SYSTEM, SERVER, PRINTER, METHODS OF CONTROLLING THE PRINT SYSTEM, THE SERVER, AND THE PRINTER, AND STORAGE MEDIUM THAT CANCEL A PRINT JOB UPON RECEIVING A CANCELLATION INSTRUCTION AND DELETE PRINT DATA OF THE PRINT JOB IF THE PRINT JOB IS STORED IN THE PRINTER

(71) Applicant: CANON KABUSHIKI KAISHA, Tokyo (JP)

(72) Inventor: Takashi Okazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/914,384

(22) Filed: Mar. 7, 2018

(65) Prior Publication Data
US 2018/0267755 A1    Sep. 20, 2018

(30) Foreign Application Priority Data

Mar. 14, 2017 (JP) .................................. 2017-049063

(51) Int. Cl.
*G06F 3/12* (2006.01)
(52) U.S. Cl.
CPC .......... *G06F 3/1273* (2013.01); *G06F 3/121* (2013.01); *G06F 3/1203* (2013.01); *G06F 3/1234* (2013.01); *G06F 3/1287* (2013.01); *G06F 3/1288* (2013.01); *G06F 3/1219* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 8,477,350 B2 | 7/2013 | Jazayeri et al. | |
| 8,867,069 B2 | 10/2014 | Jazayeri et al. | |
| 8,867,070 B2 | 10/2014 | Jazayeri et al. | |
| 2011/0299110 A1* | 12/2011 | Jazayeri | G06F 3/1204 358/1.15 |
| 2013/0208292 A1* | 8/2013 | Akari | G06F 3/121 358/1.13 |

FOREIGN PATENT DOCUMENTS

JP    2015-092394 A    5/2015

* cited by examiner

*Primary Examiner* — Andrew H Lam
(74) *Attorney, Agent, or Firm* — Venable LLP

(57) ABSTRACT

A print system includes a printer that downloads print data from a server, and performs, in accordance with one of an instruction according to the print data, and a setting value of the printer that is set in advance, one of storing of the print data as a stored print job, and printing of the print data without storing of the print job. The print system also includes the server that transmits, in a case that a cancellation instruction for cancelling printing of the print data is received from a user, the cancellation instruction to the printer, records cancellation of a print job, including the print data, in a print history, and disconnects communication with the printer. The printer cancels print processing in accordance with receiving the cancellation instruction from the server, deletes the stored print job, and records the cancellation of the print job in the print history.

12 Claims, 16 Drawing Sheets

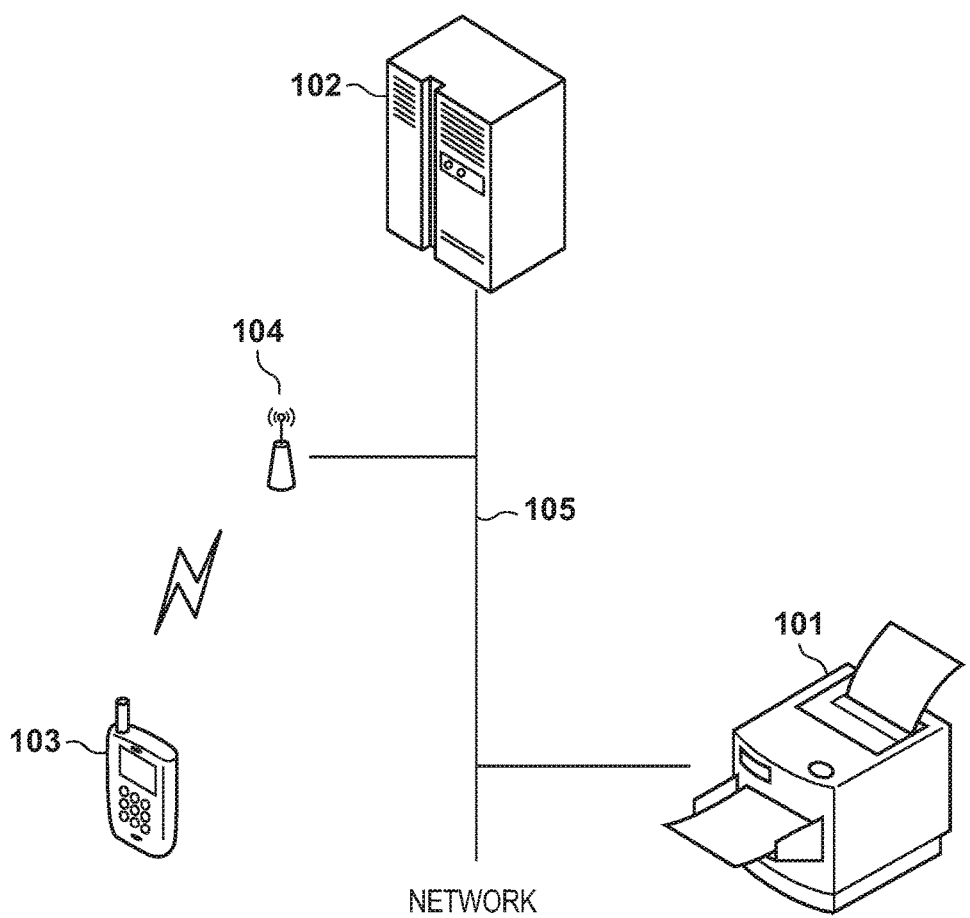

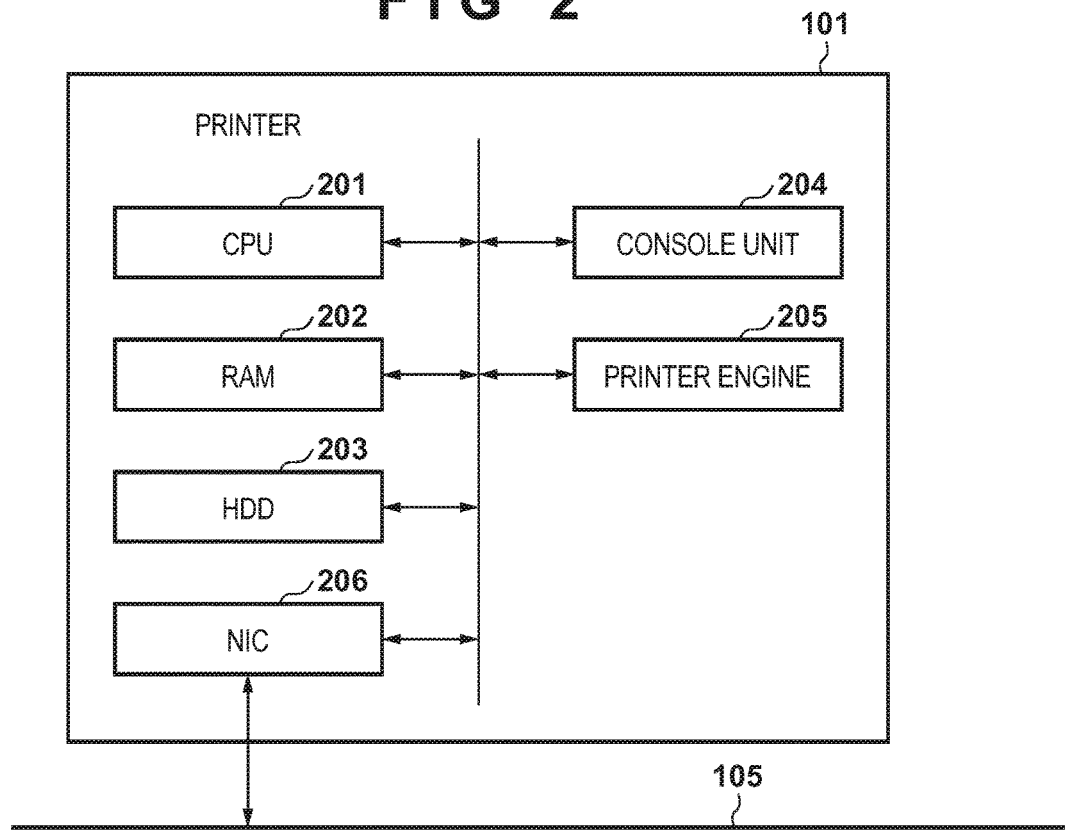
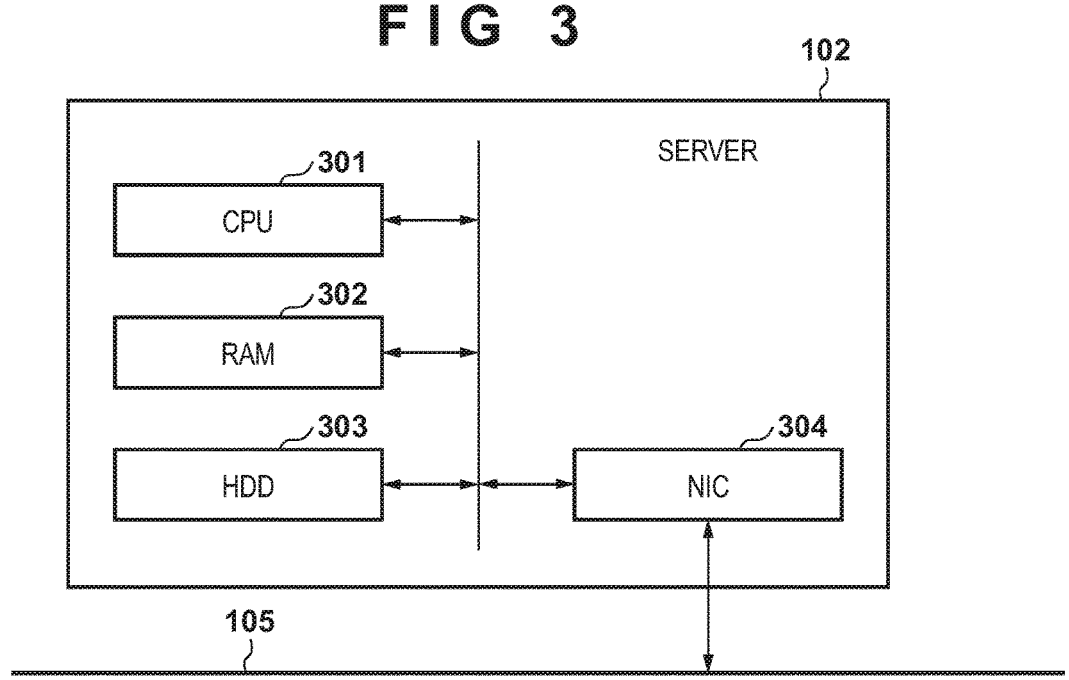

FIG. 9

| PRINTER ID | USER ID | PRINT DATA IDENTIFIER | PRINT DATA NAME | PRINT STATUS | PRINTED PAGES |
|---|---|---|---|---|---|
| 901 | 902 | 903 | 904 | 905 | 906 |
| A | abc | a | aaa.pdf | PRINTING | 50/200 |
| B | def | b | bbb.jpg | WAITING | 0/100 |
| A | | c | ccc.ras | CANCEL | 0/20 |
| ... | ... | ... | ... | ... | ... |

FIG. 12

| 1201 | 1202 | 1203 | 1204 | 1205 | |
|---|---|---|---|---|---|
| DATE AND TIME | USER ID | PRINT DATA NAME | PRINT RESULT | PRINTED PAGES | ... |
| 2015/12/09 21:29 | abc | aaa.pdf | CANCEL | 50/200 | ... |
| 2015/12/08 17:00 | def | bcd.jpg | COMPLETED | 150/150 | ... |
| 2015/12/07 18:01 | ... | efg.ras | COMPLETED | 30/30 | ... |
| ... | ... | ... | ... | ... | ... |

PRINT SYSTEM, SERVER, PRINTER, METHODS OF CONTROLLING THE PRINT SYSTEM, THE SERVER, AND THE PRINTER, AND STORAGE MEDIUM THAT CANCEL A PRINT JOB UPON RECEIVING A CANCELLATION INSTRUCTION AND DELETE PRINT DATA OF THE PRINT JOB IF THE PRINT JOB IS STORED IN THE PRINTER

This application claims the benefit of Japanese Patent Application No. 2017-049063, filed Mar. 14, 2017, which is hereby incorporated by reference herein in its entirety.

BACKGROUND OF THE INVENTION

Field of the Invention

The present invention relates to a print system, a server, a printer, methods of controlling the print system, the server, and the printer, and a storage medium.

Description of the Related Art

There are cloud systems in which a cloud server, or the like, converts image data received from a client terminal, such as a mobile terminal, into print data, and a printer downloads the print data from the server and prints the print data. This is typically called a cloud printing service. In such a system, after the server completes the conversion into print data, the server notifies the printer of the existence of the print data by a specific communication technique. In such a print data existence notification, an identifier of the print data is typically included, and the printer downloads the print data from the server by using the identifier of the print data. For example, Japanese Patent Laid-Open No. 2015-92394 discloses an example of the technique.

In such a cloud printing service, there are cases in which a printer, which is printing target data in the case in which printing of print data received from a client terminal is cancelled by the client terminal, cannot cancel the printing of the print data. This corresponds to a case in which, for example, the printer is installed in an office, and the printer is caused to print via the cloud server from outside of the office by a client terminal. In such a case, the printer ends up executing print processing without being able to recognize that the client terminal cancelled the printing of that print data, and, as a result, paper and toner are pointlessly consumed.

Also, typically, in printers, print results are logged as history information, and, in the case in which the above-described situation occurs, history information ends up being different than the intended operation of the client terminal.

SUMMARY OF THE INVENTION

An aspect of the present invention is to eliminate the above-mentioned problems with conventional technology.

A feature of the present invention is to provide a technique by which, when a printer, via a server, is caused to print data input by a user, it is possible for the printer to perform print cancellation processing in accordance with an instruction to cancel printing of the data input by the user.

According to one aspect, the present invention provides a print system for causing print data input by a user to be printed by a printer via a server, wherein the printer comprises a first memory device that stores a set of instructions, at least one first processor that executes instructions, of the set of instructions stored in the first memory device to download, from the server, the print data in accordance with an existence notification for the print data from the server, and wherein the server comprises a second memory device that stores a set of instructions, at least one second processor that executes the instructions stored in the second memory device to transmit, in a case that a cancellation instruction for cancelling printing of the print data is received from the user, the cancellation instruction to the printer, and to record cancellation of a job in a print history in addition to disconnecting communication with the printer, wherein the at least one first processor of the printer further executes the instructions, of the set of instructions stored in the first memory device, to cancel print processing in accordance with receiving the cancellation instruction from the server, and to record the cancellation of the job in the print history.

According to another aspect, the present invention provides a server for transmitting, to a printer, print data input by a user to cause the print data to be printed, the server comprising a memory device that stores a set of instructions, and at least one processor that executes instructions, of the set of instructions stored in the memory device, to function as a storage unit configured to store the print data, a notification unit configured to notify the printer that the print data is being stored, a transmission unit configured to transmit, in accordance with a data request from the printer corresponding to the notification, to the printer, the print data being stored by the storage unit, a cancelling unit configured to delete, in a case that a cancellation instruction corresponding to processing of the print data is received from the user, the print data being stored by the storage unit, and to transmit the cancellation instruction to the printer, and a control unit configured to determine, in a case that a print status for the print data is received from the printer, whether or not print data corresponding to the print status is being stored on the storage unit, and to control, in accordance with a result of the determination, so as to transmit to the printer the cancellation instruction corresponding to processing of the print data or a notification of an error.

According to yet another aspect, the present invention provides a printer for receiving print data input by a user via a server, the printer comprising a memory device that stores a set of instructions, and at least one processor that executes instructions, of the set of instructions stored in the memory device, to function as a reception unit configured to transmit, to the server, a data request in accordance with an existence notification for the print data from the server, and to receive the print data, a printing unit configured to perform printing based on the print data, a first cancelling unit configured to cancel, in a case that a cancellation instruction corresponding to print processing of the print data is received from the server during reception of the print data by the reception unit, the print processing based on the print data, a second cancelling unit configured to cancel, in a case that a notification of an error corresponding to print processing of the print data is received from the server after completion of reception of the print data by the reception unit, the print processing based on the print data, and a print log unit configured to record information indicating cancellation by the first and second cancelling units as a print history.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts an overall view of a print system according to an embodiment of the present invention.

FIG. 2 is a block diagram for describing a hardware configuration of a printer according to the embodiment.

FIG. 3 is a block diagram for describing a hardware configuration of a server according to the embodiment.

FIG. 9 depicts a view illustrating one example of print data that the server according to the embodiment manages.

FIG. 12 depicts a view illustrating one example of print history that a print log management module of the printer according to the embodiment manages.

DESCRIPTION OF THE EMBODIMENTS

Figure 4:
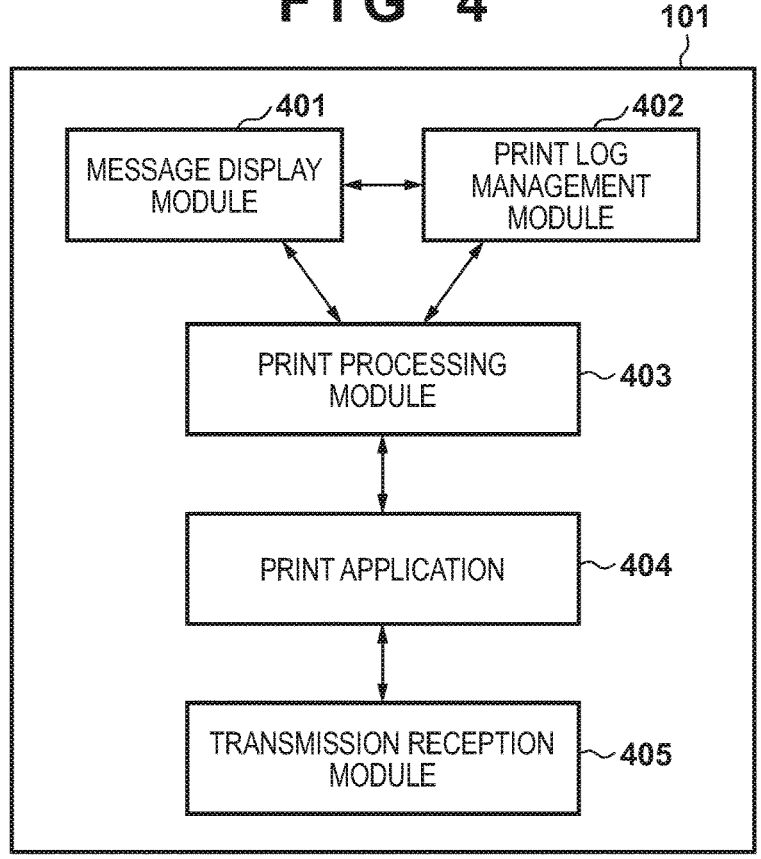
FIG. 4 is a functional block diagram for describing a functional configuration of software of the printer according to the embodiment.

Embodiments of the present invention will be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

FIG. 1 depicts an overall view of a print system according to an embodiment of the present invention.

In this print system, a printer 101 and a server 102 are connected via a network 105, and can communicate with each other. A client terminal 103 is a mobile terminal, for example, and can connect to the network 105 via an access point 104, and can communicate mutually with the server 102 wirelessly.

FIG. 2 is a block diagram for describing a hardware configuration of the printer 101 according to the embodiment.

The printer 101 is connected to the network 105 via a network interface controller (NIC) 206. A central processing unit (CPU) 201 controls the overall operation of the printer 101 by deploying a program that is stored in a hard disk drive (HDD) 203 into a random access memory (RAM) 202, and executing the deployed program. When the CPU 201 controls the printer 101, the RAM 202 is used for storing temporary data and various task processing after firmware activation of the printer 101. The HDD 203 is a storage device, and saves programs and various setting values of the printer 101, and is used for the purpose of spooling print data. A console unit 204 comprises a display unit, such as a liquid crystal panel, and causes various operation screens to be displayed on the screen of the display unit, and transfers, to the CPU 201, instructions input via the operation screen. Here, the console unit 204 is assumed to have a touch panel function. A printer engine 205 prints an image based on image data onto a recording medium (sheet). At the time of printing, the printer engine 205 performs processing, such as a color conversion, filter processing, and resolution conversion, on the image data. The NIC 206 controls data communication with an external apparatus (the server 102) on the network 105.

FIG. 3 is a block diagram for describing a hardware configuration of the server 102 according to the embodiment.

The server 102 is connected to the network 105 via an NIC 304. A CPU 301 controls the overall operation of the server 102 by deploying a program that is stored in an HDD 303 into a RAM 302, and executing the deployed program. When the CPU 301 controls the server 102, the RAM 302 is used for storing temporary data and various task processing after firmware activation of the server 102. A hard disk drive (HDD) 303 is a storage device, and saves programs, various setting values, and management information of the server 102, and is used for the purpose of storing print data.

FIG. 4 is a functional block diagram for describing a functional configuration of software of the printer 101 according to the embodiment. Note that functions illustrated in the block diagram are realized by the CPU 201 executing programs deployed in the RAM 202.

A message display module 401 displays various settings related to printing via the console unit 204, and displays print conditions and a print history received from a print processing module 403 and a print log management module 402 onto the console unit 204. The print log management module 402 manages the print history, and manages history information for respective print data, which is described later with reference to FIGS. 10A and 10B, for example.

The print processing module 403 executes image analysis processing, such as color conversion, filtering, and resolution conversion, corresponding to the printer engine 205 on print data received from outside, and controls processing for printing to a sheet and discharging a printed sheet by the printer engine 205. A print application 404, via a transmission/reception module 405, performs various communication processes with the server 102 for printing. These various communication processes include at least reception of a print data existence notification and print data from the server 102, a print data download request to the server 102 (data request), and a print status notification process. The transmission/reception module 405 generates network packets in accordance with various transmission instructions from the print application 404 and transmits the network packets to the server 102, or receives notifications and response data from the server 102, and performs analysis process thereon. For example, in a case in which the server 102 is a cloud server on the Internet, the transmission/reception module 405 processes a network protocol such as an HyperText Transfer Protocol (HTTP), Secure Sockets Layer (SSL) protocol, or Extensible Messaging and Presence Protocol (XMPP).

Figure 5:
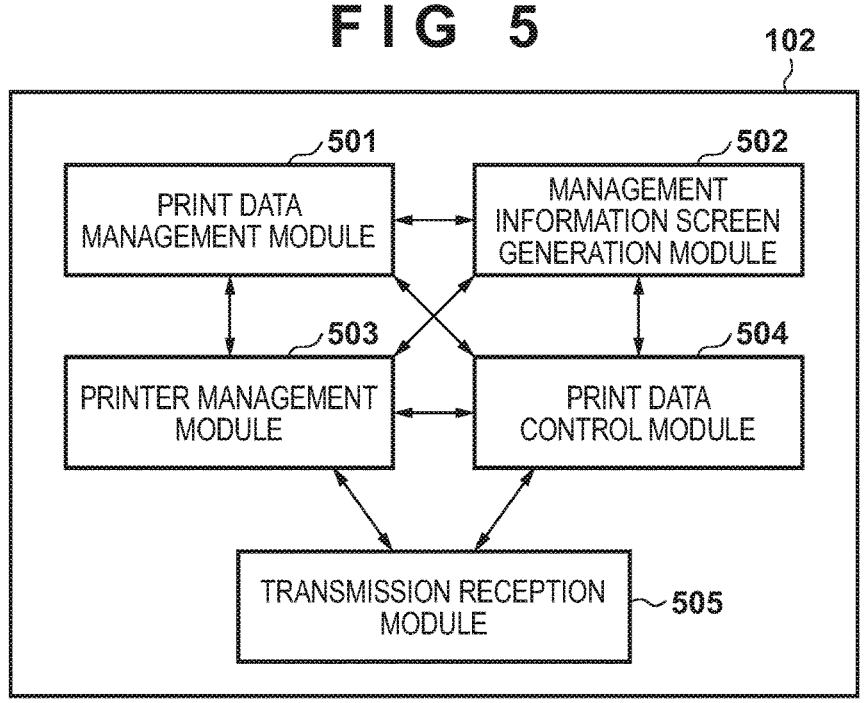
FIG. 5 is a functional block diagram for describing a functional configuration of software of the server according to the embodiment.

FIG. 5 is a functional block diagram for describing a functional configuration of software of the server 102 according to the embodiment. Note that functions illustrated in the block diagram are realized by the CPU 301 executing programs deployed in the RAM 302.

Figure 6:
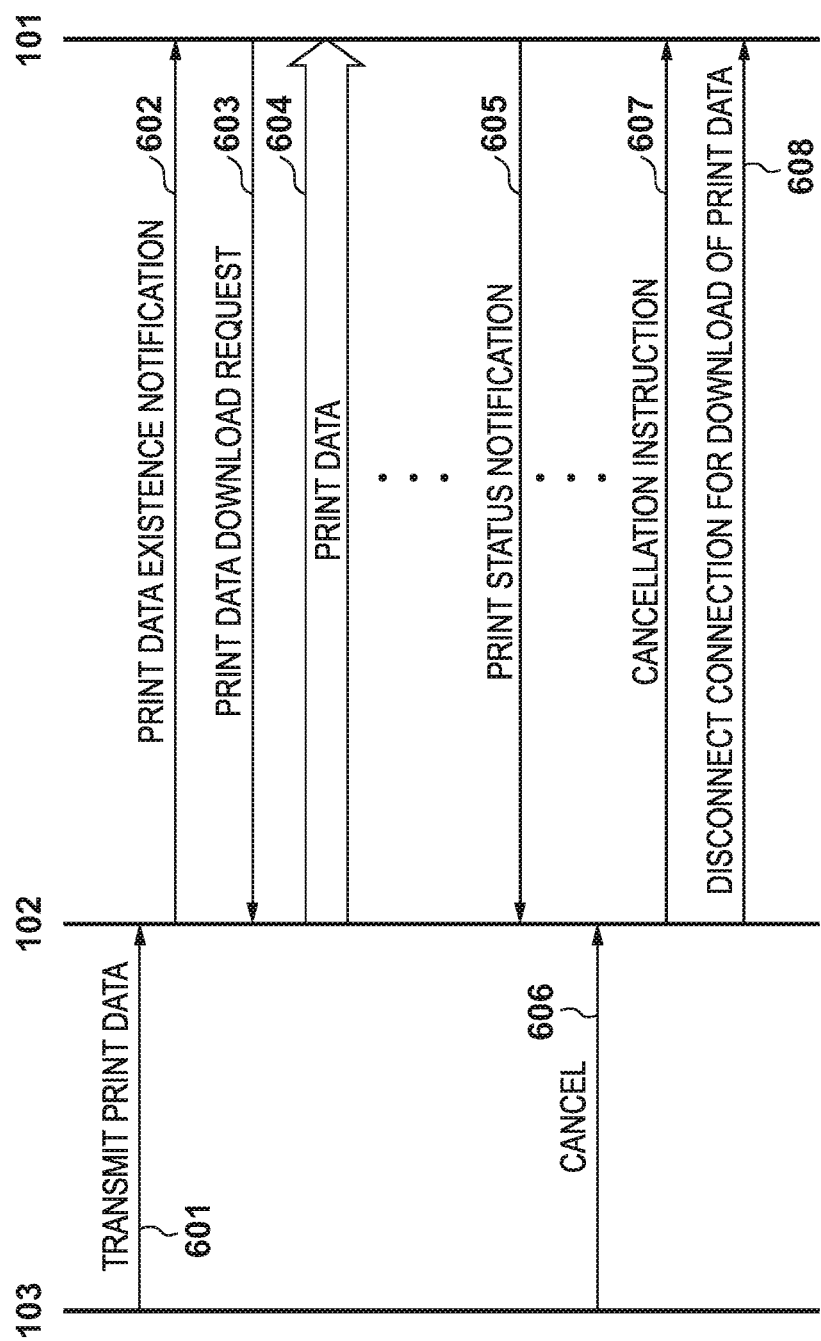
FIG. 6 depicts a view for explaining an example of a sequence in which, after a client terminal uploaded print data to the server, the client terminal cancels the print job, in the print system according to the embodiment.

A print data management module 501 stores into the HDD 303 print data that was input via a network from the client terminal 103 and manages the print data. The information of the print data that is managed here is not only the actual print data, but also includes a user identification (ID) 902, a print data identifier 903, a print data name 904, a print status 905, and printed pages 906, which are described later with reference to FIG. 9. The print data management module 501 receives this information from the client terminal 103, and manages the information, and, when an actual print process is performed, the print data management module 501 transmits the information to the printer 101 at the time of a print data existence notification 602 of FIG. 6, which is described later. Also, the print data management module 501, when the server 102 receives a print status notification 605 as indicated in FIG. 6 from the printer 101, updates information of the print status 905 and the printed pages 906, which are described later with reference to FIG. 9, based on the print status notification information.

A management information screen generation module 502 generates a management information screen by obtaining information of print data that the print data management module 501 manages and information of a printer that a printer management module 503 manages. This management information screen indicates a screen displayed in a user interface of the server 102 and a screen of a printer and print data management information site that is published on the Internet. The printer management module 503 stores various kinds of information of printers managed by the server 102 in the HDD 303, and manages the information. This various information of printers includes various print setting values that the printers support, a current status of the printers, and the like. Also, as examples of the various print setting values, there are the size of the sheets that a printer supports, existence or absence of color and black and white printing functions, and a double-sided printing function, the number of feed trays, and the like. Additionally, as examples of a current status of a printer, there are the remaining amount of toner in the printer, existence or absence of sheets in a feed tray, existence or absence of jam detection, open/closed state of a cover, or the like.

The server 102 receives from the client terminal 103 a request including what kind of print data to print using which printer. By the printer management module 503 and the print data management module 501 cooperating to perform processing in response to this request, it is possible to specify which printer to cause to print the print data that the server 102 received as input from the client terminal 103.

A print data control module 504 generates print data, and performs image conversion processing. There is the possibility that a format of the print data input from the client terminal 103 cannot be printed by the printer being managed by the server 102. Accordingly, the print data control module 504 obtains information of the printer that is the target of printing from the printer management module 503, and confirms the print data formats that the printer supports. Then, if the input print data is of a print data format that the printer does not support, the print data control module 504 converts the print data into a print data format that the printer supports. A transmission/reception module 505 generates network packets and transmits the network packets to the printer 101 in accordance with various transmission instructions from the printer management module 503 and the print data control module 504. Also, the transmission/reception module 505 receives notifications and various requests from the printer 101, and performs analysis processing thereon. For example, in a case in which the server 102 is a cloud server on the Internet, the transmission/reception module 405 processes a network protocol, such as HTTP, SSL, or XMPP.

FIG. 6 depicts a view for explaining an example of a sequence in which, in a print system according to the embodiment, after the client terminal 103 transmits print data to the server 102, the client terminal 103 cancels the print job.

In reference numeral 601, the client terminal 103 transmits to the server 102 print data for causing the printer 101 to print. At that time, the client terminal 103 transmits to the server 102 a user ID of the user operating the client terminal 103 in addition to the print data. Accordingly, in reference numeral 602, the server 102 notifies the printer 101 that the print data was received and that the print data exists on the server 102. The printer 101, having received this notification, makes a request to the server 102 to download the print data in reference numeral 603. The print data download request includes an identifier of the print data that is the target of the download and various setting values necessary for the print processing, as were described in the description of the printer management module 503. Then, in reference numeral 604, the server 102 transmits, to the printer 101, the target print data in accordance with the download request. In this way, when printing by the printer 101 is started, in reference numeral 605, the printer 101 makes a notification to the server 102 of the total number of pages to be discharged by the print processing, the current number of pages that have been discharged, and the identifier of the print data. This print status notification processing is performed every time the printer 101 prints and discharges a predetermined number of pages or at regular time periods.

Then, in reference numeral 606, the client terminal 103, by deleting the print data via a print data management screen that the management information screen generation module 502 is displaying, makes a print processing cancellation instruction to the server 102 for that print data. When this cancellation instruction is performed, the server 102 deletes the print data that is stored in the HDD 303 and that is the target of the cancellation instruction, and also deletes the information related to the print data, such as the identifier of the print data, which is described later. Then, in reference numeral 607, in accordance with the cancellation instruction, the server 102 makes a notification to the printer 101 for the cancellation instruction. Accordingly, the printer 101 recognizes the cancel request on the job being currently printed. The behavior of the printer 101 differs at this point depending on the job progress status at that point in time.

Assume that at the point in time that the cancellation instruction is made from the server 102, the printer 101 is in the middle of continuously receiving print data that is being sent from the server 102. In such a case, in order to improve print performance, the printer 101 will be receiving subsequent print data, in parallel, while successively printing received print data, rather than starting the printing only after receiving all of the print data. When the cancellation instruction is made by the client terminal 103 while the printer 101 continuously receives print data, the server 102, in reference numeral 608, ceases to be able to continuously send the print data to the printer 101. Accordingly, the server 102 disconnects the connection for downloading the print data that has been established with the printer 101. At that time, in a case in which the printer 101 successfully receives the cancellation instruction in reference numeral 607, a normal connection disconnection (disconnection by FIN) occurs. Meanwhile, in a case in which the printer 101 does not successfully receive the cancellation instruction in reference numeral 607, a connection disconnection (disconnection by RST) occurs due to an abnormality.

In this sequence, the printer 101 receives the cancellation instruction when it is in the middle of receiving the print data and print processing has been started. Then, when the transmission of the print data is interrupted, the processing on the subsequent print data that has not been yet received is not performed, and print cancellation processing is performed. In such a case, the printer 101 ends up performing the print cancellation processing upon detection of a data reception timeout or a connection disconnection in a case in which the printer 101 cannot successfully receive the cancellation instruction.

Figure 7:
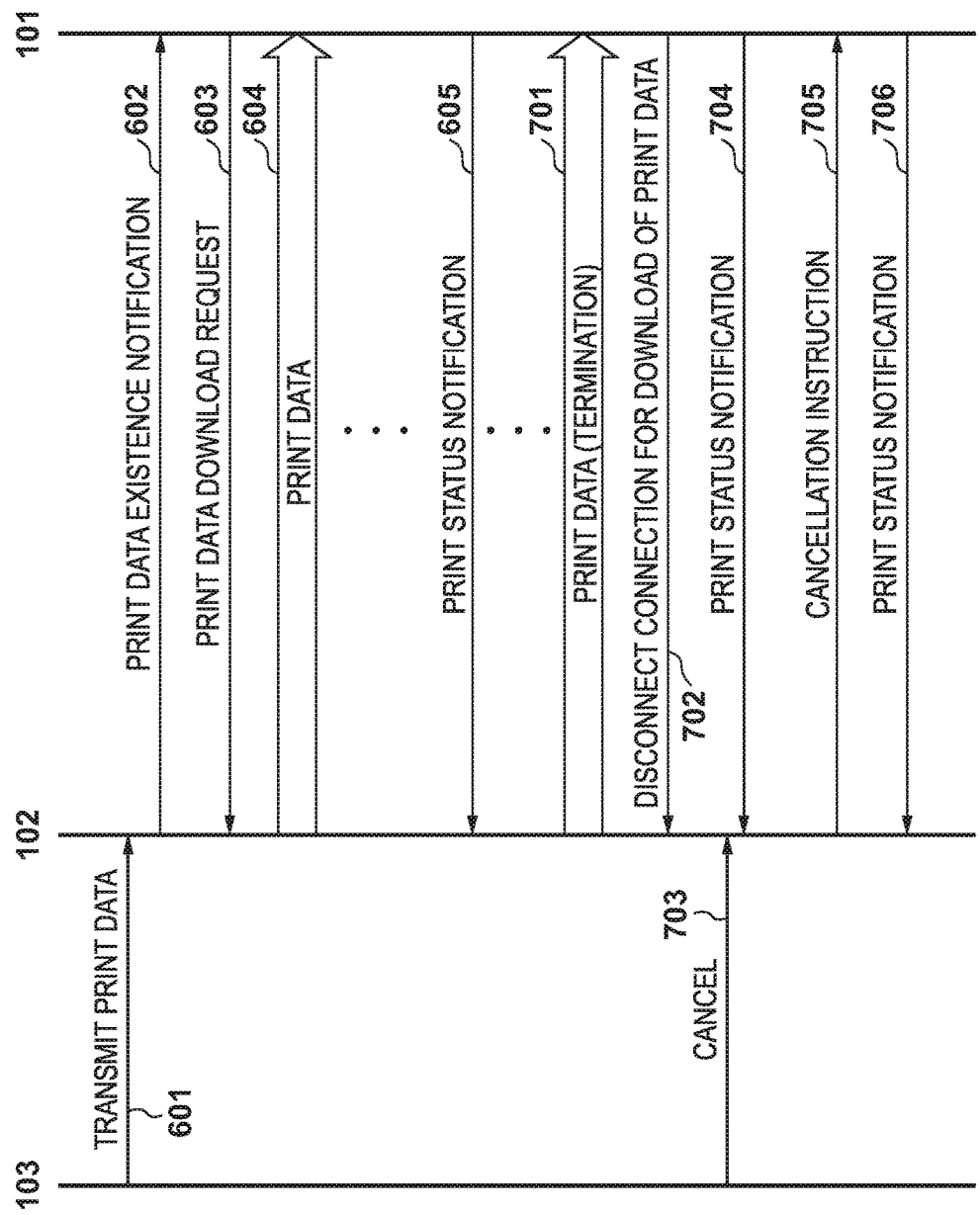
FIG. 7 depicts a view for explaining an example of a sequence in which, after the printer completed reception of print data from the server, the client terminal cancels the print job before the printer completes the print job, in the print system according to the embodiment.

FIG. 7 depicts a view for explaining an example of a sequence in which, in the print system according to the embodiment, after the printer 101 completed reception of print data from the server 102, the client terminal 103 cancels the print job before the printer 101 completes the print job. In FIG. 7, reference numerals 601 to 605 are similar to in FIG. 6, and so, a description thereof is abbreviated.

In reference numeral 701, the server 102 completes the downloading of the print data to the printer 101 that was started in reference numeral 604. With this, in reference numeral 702, the printer 101 detects that all of the print data has been downloaded, and normally disconnects the connection for downloading the print data that was established with the server 102. At that time, the printer 101 has completed the downloading of the print data, but the print processing of the print data is ongoing. Accordingly, the printer 101 will continuously perform print status notifications to the server 102 until printing of all pages completes.

Then, in reference numeral 703, the client terminal 103, by deleting, via a print data management screen that the management information screen generation module 502 is displaying, the print data that was transmitted in reference numeral 601, makes a print processing cancellation instruction to the server 102. When this cancellation instruction is performed, the server 102 deletes the print data that is stored and that is the target of the cancellation instruction, and also deletes the information related to the print data, such as the identifier of the print data, which is described later.

After that, in reference numeral 704, the printer 101 continues to make notifications to the server 102 of the print status. Then, since the server 102 received the job cancellation instruction from the client terminal 103, the server 102, in reference numeral 705, makes an instruction to the printer 101 to cancel the job that is currently printing. By this instruction, the printer 101 cancels the job for which the instruction was made. Then, in reference numeral 706, the printer 101 makes a print status notification, and thereby, the server 102 is notified from the printer 101 that the job was cancelled.

Figure 8:
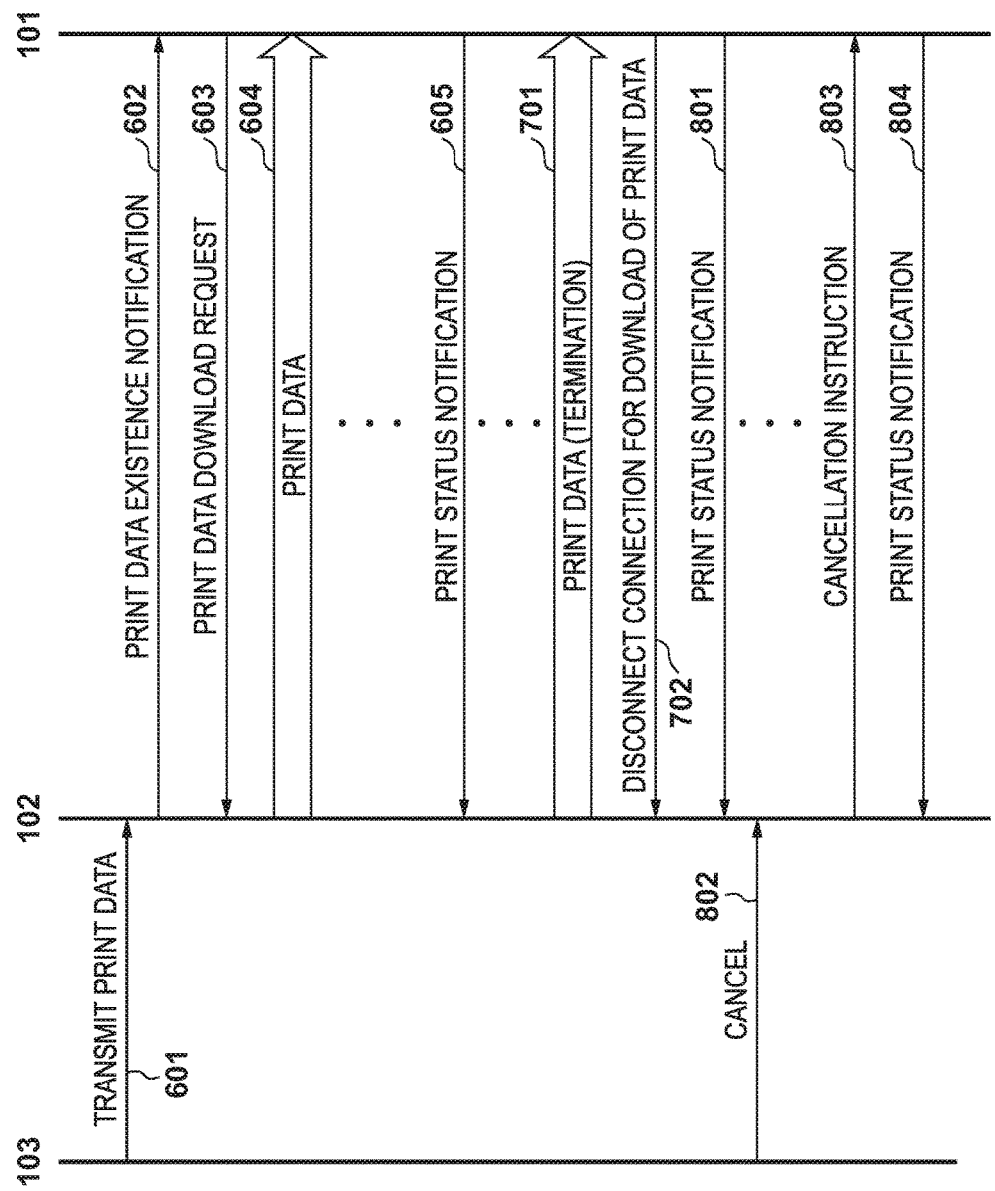
FIG. 8 depicts a view for explaining an example of a sequence in the print system according to the embodiment in which, after the printer completed the reception and the print job of print data, the client terminal cancels the print job.

FIG. 8 depicts a view for explaining an example of a sequence in the print system according to the embodiment in which, after the printer 101 completes reception and the printing of print data, the client terminal 103 cancels the print job. In FIG. 8, reference numerals 601 to 605, 701, and 702 are similar to those in the description of FIG. 6 and FIG. 7, and so, a description thereof is abbreviated.

In reference numeral 702, downloading of the print data has been completed, but the print processing of the printer 101 is ongoing. Accordingly, the printer 101 will continuously perform print status notifications to the server 102 until printing of all pages completes.

So, in reference numeral 801, the printer 101 performs a print status notification to the server 102. At that time, however, all of the print data has been transmitted to the printer 101, and the print processing has also been performed. Then, in reference numeral 802, the client terminal 103 makes a print processing cancellation instruction to the server 102, by deleting, via a print data management screen that the management information screen generation module 502 is displaying, the print data that was received in reference numeral 601. When this cancellation instruction is performed, the server 102 deletes the print data that is being stored and that is the target of the cancellation instruction, and also deletes the information related to the print data, such as the identifier of the print data, which is described later. Then, in reference numeral 803, the server 102 instructs the printer 101 to cancel the job. By this cancellation instruction, the printer 101 cancels the job for which the instruction was made. At this timing, however, the print processing has already completed, and the cancellation cannot be performed even though the instruction to cancel the job was made. Then, in reference numeral 804, the printer 101 makes a notification to the server 102 of the print status, and the server 102 is notified thereby that the job could not be cancelled.

FIG. 9 depicts a view illustrating one example of print data that the server 102 according to the embodiment manages.

A printer ID 901 indicates an identifier of a printer that the printer management module 503 is managing. The printer management module 503 manages various print setting values of a printer and the current status information of a printer by using this printer identifier. The user ID 902 is user identification information of the client terminal 103. Accordingly, the server 102 can identify which user on the client terminal 103 is making a print request. The server 102 generates and manages the print data identifier 903 based on print data received from the client terminal 103. The print data identifier 903 is exchanged between the server 102 and the printer 101 in print data existence notifications and download requests from the printer, and is thereby used in print processing and print status notification processing between the two. The print data name 904 is displayed by the management information screen generation module 502 on a print data management screen as the title of print data that the server 102 received. Also, the printer 101 receives the print data name 904 in addition to the print data when the printer 101 downloads print data, and the message display module 401 displays the print data name 904 as the title of the print data on the console unit 204, and the print log management module 402 manages the print data name 904 as print processing history information.

The print status 905 includes "standby," which indicates that printing has not yet started, "currently printing" when print processing is being performed normally, "cancelled," which indicates that the printer 101 stopped printing for some reason, and statuses indicating print results. Cases in which the print result is "interrupted" include a toner outage in the printer 101, a paper outage of a feed tray, a cover being open, the occurrence of a jam, or the like. The printer 101 successively notifies to the server 102 these print statuses, and the server 102 manages this information as print data processing statuses. Also, in the case in which a job is cancelled, the server 102 displays that printing is cancelled. Printed pages 906 indicates the number of pages of print data that the printer 101 has printed and the total number of pages scheduled to be printed. As in the description of the print status notification, the printer 101 notifies, to the server 102, the total number of pages to be discharged and the number of pages that have currently been discharged by the print data print processing, in addition to the identifier of the print data. The server 102 manages this information as a number of printed pages.

Figure 10A:
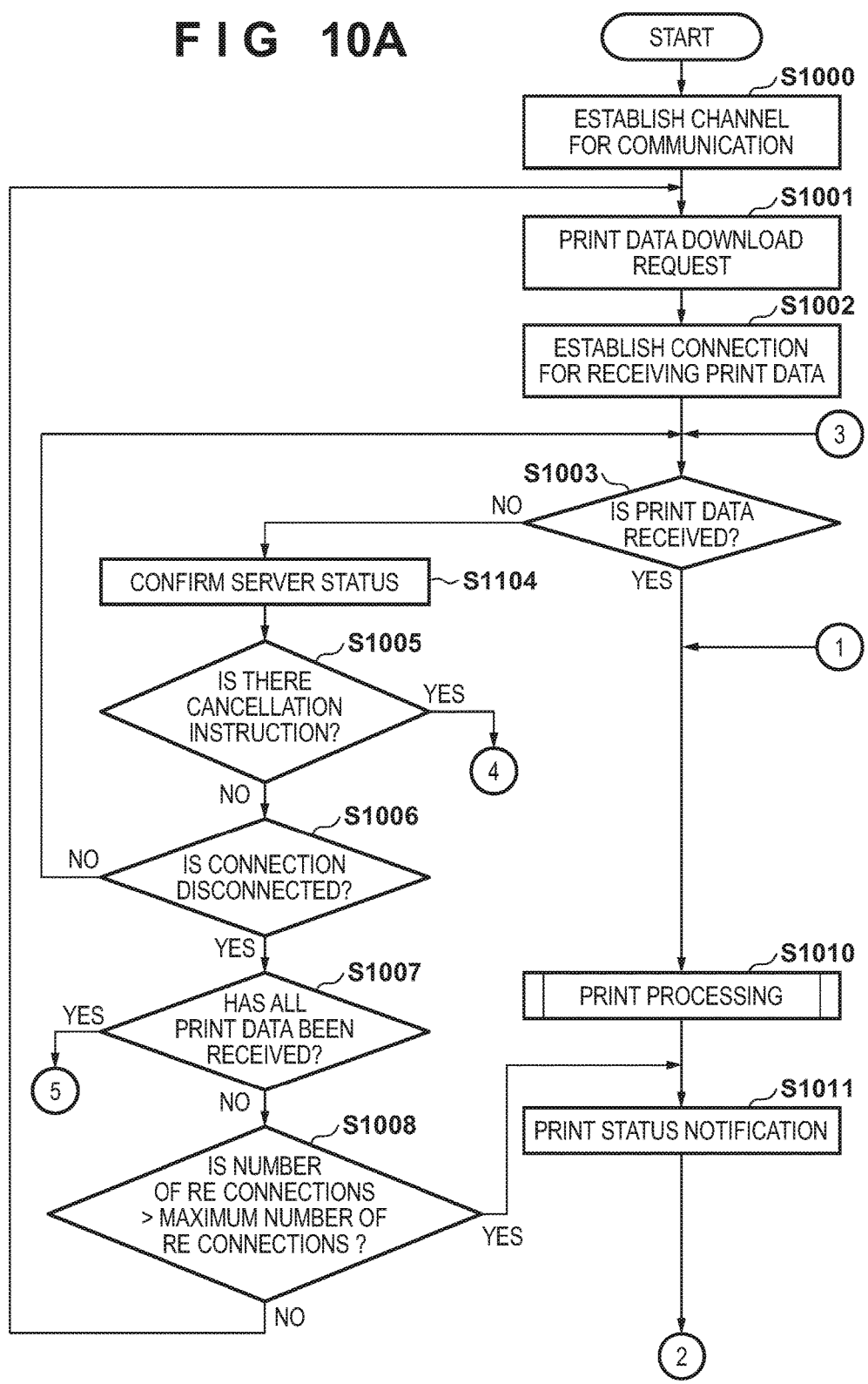
FIGS. 10A and 10B are flowcharts for describing processing of the printer according to the embodiment.
Figure 10B:
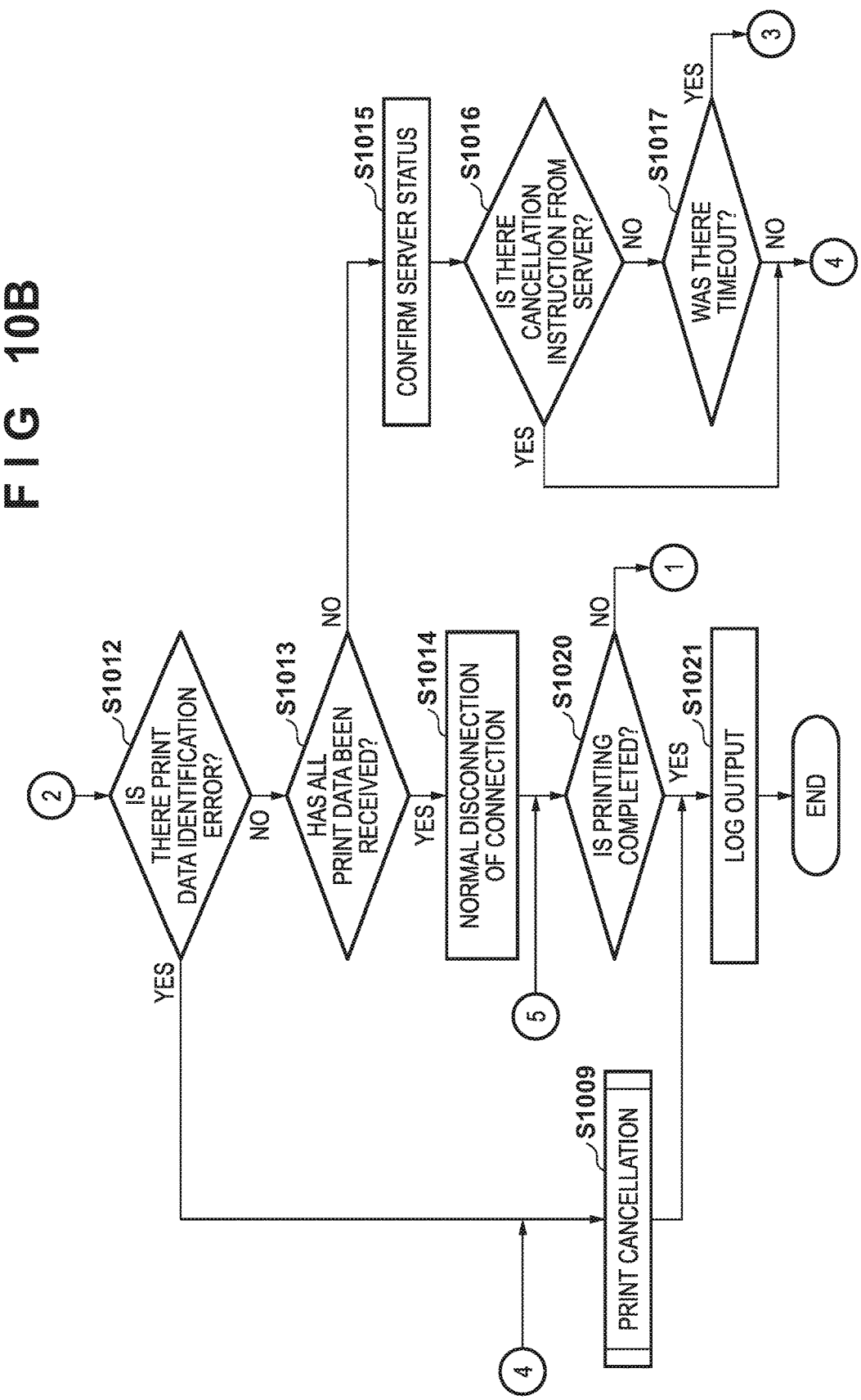

FIGS. 10A and 10B are flowcharts for describing processing of the printer 101 according to the embodiment. Also, the processing illustrated by this flowchart is achieved by the CPU 201 executing a program deployed into the RAM 202 from the HDD 203. The flowcharts illustrated in FIGS. 10A and 10B are started upon reception of a print data existence notification from the server 102. Note that in the description below, the processing is described as being executed by the CPU 201 functioning as the modules indicated in FIG. 4.

First, in step S1000, the print application 404 establishes a channel for communication in order to perform print data download processing in relation to the server 102 when the print application 404 receives a print data existence notification from the server 102 via the transmission/reception module 405. More specifically, an XMPP protocol for message communication is used. Next, the processing proceeds to step S1001, and the print application 404 makes a print data download request to the server 102 by using the channel that was established in step S1000. By this download request, the print application 404 obtains, from the server 102, the identifier 903 of the print data that is the target of the download, in addition to various setting values necessary for print processing, as were described in the description of the printer management module 503. Then, the processing proceeds to step S1002, and the transmission/reception module 405 responds (ACK) to the start (SYN) of establishment of a connection for receiving print data from the server 102, and establishes a connection with the server 102. When, in this way, the print application 404 receives the print data in step S1003, and obtains the setting values and print data necessary for print processing, the processing proceeds to step S1010, and the print application 404 performs the print processing based on these data.

Meanwhile, in a case in which the print data could not be received in step S1003, the processing proceeds to step S1004, and the CPU 201 confirms the status of the server 102 (details of instruction received in the channel for communication). In step S1005, the CPU 201 determines whether or not a job cancellation instruction was received, and, when a cancellation instruction was received, the processing advances to step S1009, and otherwise, the processing proceeds to step S1006. In step S1006, the print application 404 checks the state of the connection for downloading the print data from the server 102 in relation to the transmission/reception module 405. When it is determined that a connection is established here, the reception of the print data may be delayed, and so, the processing proceeds to step S1003, and the print application 404 waits for the reception of the print data.

Meanwhile, when the print application 404 determines in step S1006 that the connection has been disconnected, the processing proceeds to step S1007, and it is determined whether or not all of the print data has been received. Then, when it is determined that all of the print data has been received, the processing proceeds to step S1020, and the print application 404 determines whether or not printing was completed. Here, when it is determined that printing completed in step S1020, the processing proceeds to step S1021, and the print application 404 outputs a log and ends this processing. This corresponds to the case of previously described FIG. 8.

Meanwhile, in step S1007, when the print application 404 determines that not all of the print data has been received, the processing proceeds to step S1008, and the print application 404 checks the number of re-connections that have been made to request re-connection to the server 102. If the number of re-connections here does not exceed a maximum threshold, the processing returns to step S1001, and a print data download request is made to the server 102 once again. Meanwhile, when, in step S1008, the print application 404 determines that the number of re-connections exceeds the maximum threshold, subsequent print data cannot be downloaded from the server 102. Accordingly, in such a case, the processing proceeds to step S1011, and the print application 404 obtains the number of pages that have already been discharged by the print processing from the print processing module 403, and makes a notification to the server 102 of the print status. In this print status, at least the identifier of the target print data for which the print processing is being performed is included, and the total number of pages that were originally scheduled to be discharged, the current number of pages that were discharged, and the current print status information described in reference numeral 905 of FIG. 9 are included. Also, in a case in which print processing is being performed in step S1010, the print processing module 403 makes a notification as a print status to the server 102 of the number of pages that are already discharged whenever a predetermined number of pages are discharged or every specified time period. In this way, when the print application 404 receives a notification from the print processing module 403, the print application 404 notifies the server 102 of the print status.

At that time, when the print data management module 501 of the server 102 receives, from the printer 101, this print status notification, the print data management module 501 confirms that the print data identifier included in this notification exists in the print data identifier 903 of the management information described in FIG. 9. Also, in a case in which the print data identifier exists in the management information, the print data management module 501 updates management information with the number of pages that have already been discharged and the print status that are included in this received notification, and transmits a normal response to the printer 101. Meanwhile, in a case in which the received print data identifier does not exist in the management information, the print data management module 501 transmits a print data identification error to the printer 101.

In the processing of step S1006, step S1007, and step S1008 to step S1011 of FIGS. 10A and 10B, when the communication between the printer 101 and the server 102 becomes interrupted, a re-connection is attempted, and a notification of the print status is made to the server 102. Then, in step S1017, when it is confirmed that a timeout and a print data reception error occurred, a notification is made to the server 102.

As another example of this, a configuration may be taken such that when the printer 101, in step S1006, detects that the communication with the server 102 is interrupted, the processing proceeds to a later described print cancellation processing of step S1009.

In step S1012, the print application 404 receives from the server 102 a response to the print status notification, and determines whether or not a print data identification error is included in the response. In a case in which the print data identification error is in the response, the processing proceeds to step S1009, and the print application 404 cancels the print processing, and ends this print processing. When the print processing is cancelled in step S1009, the print processing module 403 passes, to the print log management module 402, some of the setting values received from the print application 404 in step S1003 and print cancellation history information. The print log management module 402 stores and manages information passed from the print processing module 403 as print history.

In the case of a response other than print data identification error in step S1012, the processing proceeds to step S1013, and the print application 404 determines whether or not all of the print data was received. In a case in which unreceived print data exists here, the processing proceeds to 1015, and the status of the server 102 is confirmed. Then, the processing proceeds to step S1016, the print application 404 determines whether or not there is a job cancellation instruction from the server 102, and, in a case in which there is no cancellation instruction, the processing proceeds to step S1017, and the print application 404 determines whether or not a job reception timeout occurred. In a case in which a timeout has not occurred here, the processing returns to step 1003, and subsequent data reception is awaited. Meanwhile, in a case in which, in step S1016, there is a job cancellation instruction from the server 102, the processing proceeds to step S1009, and the print application 404 performs job cancellation processing, and the processing proceeds to step S1021.

Also, when the print application 404 in step S1013 determines that all print data has been received, the processing proceeds to step S1014. In step S1014, the print application 404 performs normal disconnection processing (FIN disconnection) of the connection for downloading the print data in relation to the server 102 via the transmission/reception module 405, and the processing proceeds to step S1020. In step S1020, the print application 404 makes a confirmation in relation to the print processing module 403 as to whether printing completed or whether print processing is ongoing. Here, when print processing has not completed and printing is ongoing, the processing returns to step S1010, and the print processing module 403 continues the print processing. Also, when it is determined that print processing has completed in step S1020, printing has ended normally and so, the processing proceeds to step S1021, the print result history is output, and this processing is ended.

In this way, when the print application 404 makes a notification to the server 102 of the print status in step S1011, and, in step S1012, the print data identification error occurs, the processing proceeds to step S1009, and job cancellation processing is executed. Then, the print application 404 is able to output the job cancel print history in step S1021. Also, in a case in which the cancellation instruction is received from the server 102 in step S1016, job cancellation processing is performed in step S1009, the processing proceeds to step S1021, and the print history can be output.

In the foregoing processing, the printer 101 receives the print data identification error, and then the printer 101 performs cancellation processing upon receiving the cancellation instruction from the server 102. An example of confirming execution of cancellation processing by an action by a user of the printer 101 in this case is illustrated in FIG. 13.

Figure 13:
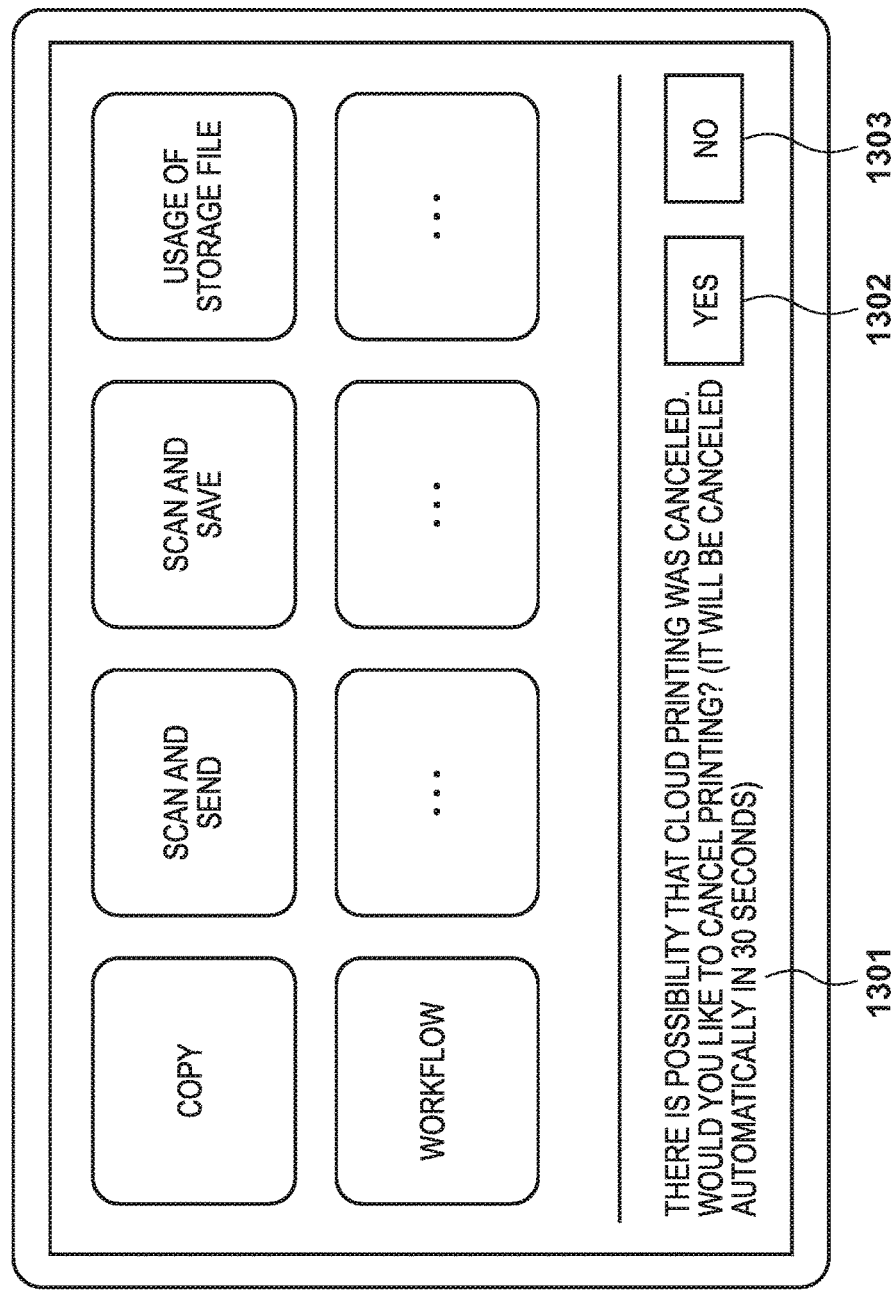
FIG. 13 depicts a view illustrating one example of a user interface displayed on a console unit of the printer according to the embodiment.

FIG. 13 depicts a view illustrating one example of a user interface displayed on the console unit 204 of the printer 101 according to the embodiment.

Here, the print application 404 causes the message display module 401 to display a message 1301. The message 1301 is an inquiry to a user as to whether or not to stop (i.e., to cancel) printing since there is the possibility that the print data was cancelled from the client terminal 103 and the server 102. Accordingly, the user of the printer 101 selects whether to cancel the print processing that is interrupted or to continue to perform the printing. Here, the user selects a "YES" button 1302 in the case of cancelling the print processing. On the other hand, the user selects a "NO" button 1303 when continuation of the print processing is desired.

Considering the possibility that the user of the printer 101 is not close to the printer 101 and the possibility that the user will not select either button, however, a configuration may be taken so as to have a time period over which selection is possible, and to cancel the printing automatically in a case in which there is no selection over the fixed time period. The cancellation processing in such a case is processing that is similar to the cancellation processing of step S1009 of FIG. 10B.

In a case in which the "NO" button 1303 is selected and the user selects to continue printing without cancelling the printing, the print application 404 advances the processing to step S1020 without executing the print cancellation in step S1009. Then, a configuration may also be taken such that it is determined whether or not printing completed, and printing is continued when printing has not yet completed.

FIG. 12 depicts a view illustrating one example of print history that the print log management module 402 of the printer 101 according to the embodiment manages.

A date and time 1201 indicates a date and time at which print processing ended. The print processing module 403 notifies the end date and time to the print log management module 402 when print processing ends. A user ID 1202 is the same as the user ID 902 of FIG. 9. A print data name 1203 is the same as the print data name 904 of FIG. 9. The user ID 1202 and the print data name 1203 are included in setting values obtained from the server 102, and the print processing module 403 notifies these to the print log management module 402. A print result 1204 indicates a print processing result, and a print result that the print processing module 403 processed in accordance with the flowcharts of FIGS. 10A and 10B is notified to the print log management module 402. A printed page 1205 is a history of the number of pages for which printing completed and that were discharged, and the total number of pages scheduled to be discharged. The print log management module 402 outputs and manages this history information.

In the sequences of FIG. 6, FIG. 7, and FIG. 8, described previously, when a print cancellation operation is performed from the client terminal 103, notification thereof is received, and the print processing is cancelled by the printer 101. Accordingly, the printer 101 can leave a print history that is the same as the cancel operation of the client terminal 103. Also, several causes for print cancellation can be considered, and those causes may be included in the result.

Figure 11A:
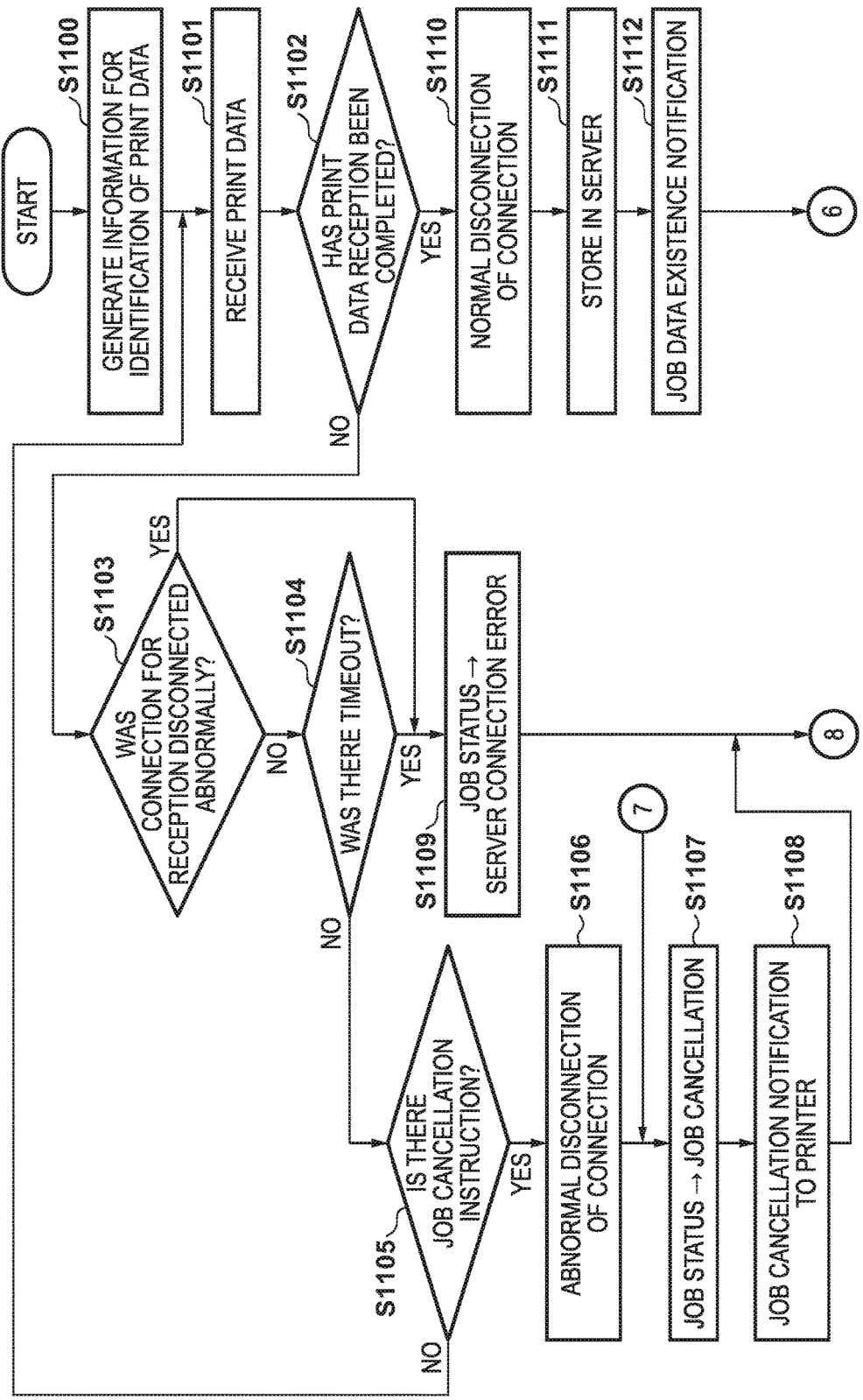
FIGS. 11A and 11B are flowcharts for describing processing of the server according to the embodiment.
Figure 11B:
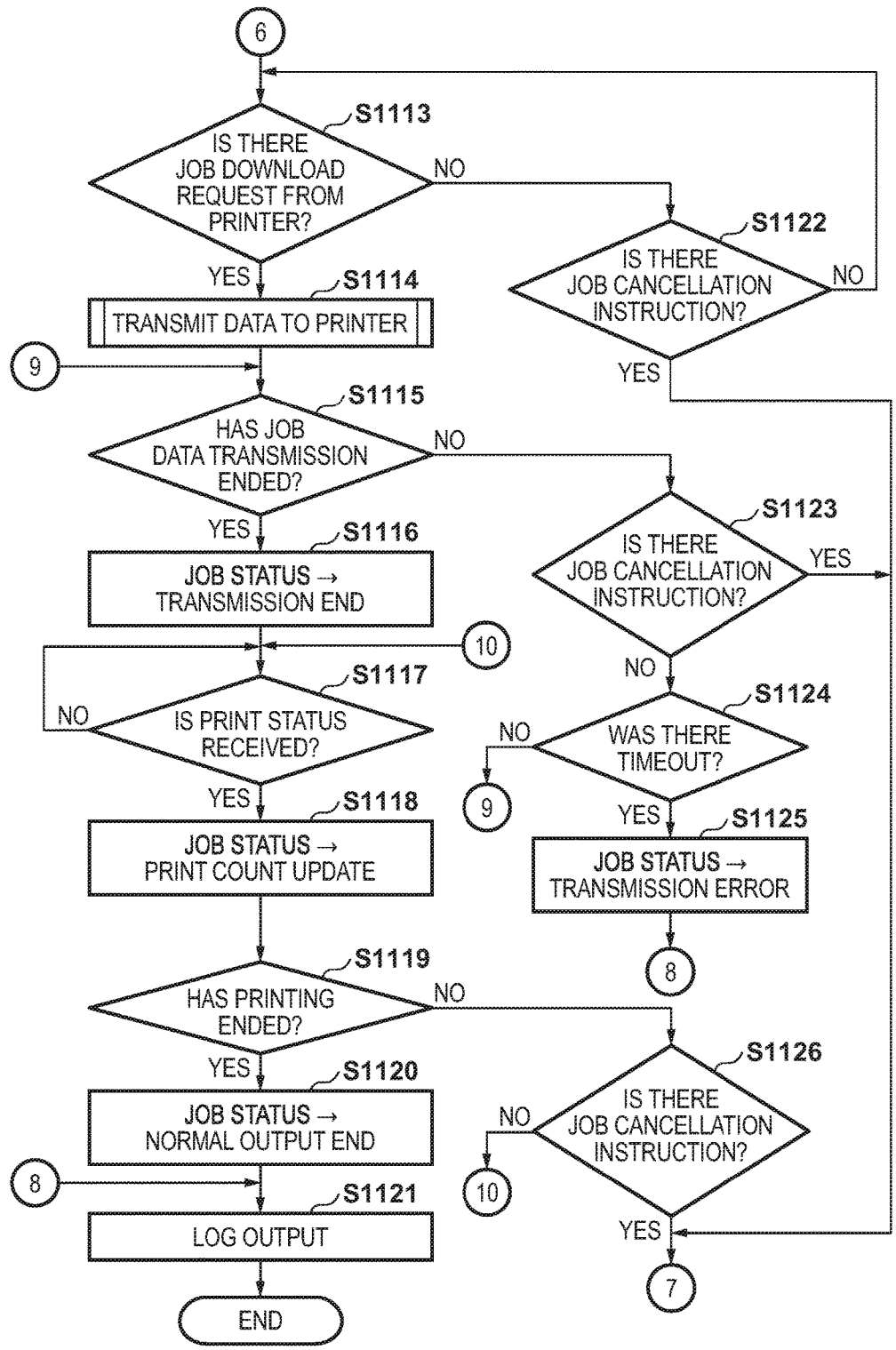

FIGS. 11A and 11B are flowcharts for describing processing of the server 102 according to the embodiment. Also, the processing illustrated by this flowchart is achieved by the CPU 301 executing a program deployed into the RAM 302 from the HDD 303. This processing is started upon reception of print data from the client terminal 103 in reference numeral 601 of FIG. 6 via the transmission/reception module 505 (when a communication connection for job reception is established).

First, in step S1100, the CPU 301 generates information for identifying the print data. Next, the processing proceeds to step S1101, the CPU 301 receives subsequent print data from the client terminal 103, the processing proceeds to step S1102, and the CPU 301 determines whether or not print data reception has completed. In a case in which the reception has not completed, the processing proceeds to step S1103, and, in a case in which the reception has completed, the processing proceeds to step S1110.

In step S1103, the CPU 301 determines whether or not there was an abnormal disconnection of the connection for receiving print data. When it is determined that there was an abnormal disconnection here, the processing proceeds to step S1109. Otherwise, the processing proceeds to step S1104, and it is determined whether there is a print data reception delay. Here, in the case that the print data reception has stagnated within a given defined time period, a timeout error will be caused to occur. In a case in which a timeout error occurred, the processing proceeds to step S1109, the job status result is made to be "server connection error", the processing proceeds to step S1121, a print job history indicating the server connection error is output, and this processing ends.

Meanwhile, when the timeout has not occurred in step S1104, the processing proceeds to step S1105 in order to receive subsequent print data, and the CPU 301 determines whether or not cancellation of a print job that is being received or that was placed in a queue was performed. Here, in a case in which an instruction to cancel a print job that is currently being executed was made, the processing proceeds to step S1106. Otherwise, the processing proceeds to step S1101, and subsequent print data is received. In step S1106, the CPU 301 performs a connection disconnection (abnormal disconnection according to RST) to stop the reception of the print data that is being received since the print job that is being received was cancelled. After that, the processing proceeds to step S1107, the CPU 301 sets the job status to "job cancellation", the processing proceeds to step S1108, and, through a channel for communication that is established at the time of activation of the printer 101, the CPU 301 makes a notification to the printer 101 of the cancellation of the job that is being executed. Then, the processing proceeds to step S1121, and the CPU 301 outputs the print job history indicating the job cancellation, and ends this processing.

Meanwhile, in a case in which the CPU 301 in step S1102 determined that the reception of print data completed, the processing proceeds to step S1110, and the CPU 301 normally disconnects (FIN) the communication connection for receiving the print job. Then, the processing proceeds to step S1111, and the CPU 301 stores the received print job in the server 102 (cloud). At this time, the job status becomes a status meaning "placed in the cloud". Next, the processing proceeds to step S1112, and the CPU 301, to the printer 101 indicated by the printer ID in the print data, makes a notification through the channel for communication established at the time of activation of the printer 101 that there is a received print job. This is the previously described print data existence notification. Then, the processing proceeds to step S1113, and the CPU 301 waits for the print data download request from the printer 101. When the download request is received here, the processing proceeds to step S1114, but, in a case in which there is no download request, the processing proceeds to step S1122, and it is determined whether or not job cancellation was performed from the client terminal 103 similarly to in the previously described step S1105. In a case in which a cancellation instruction was made for a currently being executed job, the processing proceeds to step S1107, and similar processing is performed as to what was described previously. Also, in a case in which it is not a cancellation instruction, the processing proceeds to step S1113, and a download from the printer 101 is awaited.

When the download request is received, the CPU 301, in step S1114, transmits the print data to the printer 101. Next, the processing proceeds to step S1115, and the CPU 301 determines whether or not print data transmission ended. When it is determined that print data transmission ended, the processing proceeds to step S1116, and, otherwise, in step S1123, similarly to step S1105 and step S1122 described previously, it is determined whether or not job cancellation is instructed. When it is determined that a cancellation instruction was performed here, the processing is advanced to step S1107, and processing similar to what was described previously is performed. Meanwhile, when there is no cancellation instruction, the processing proceeds to step S1124, and the CPU 301 determines whether or not a timeout occurred in the job transmission. In the case of communication stagnated within a given defined time period, a timeout error is generated, and, in a case in which the timeout error occurs, the processing proceeds to step S1125. In step S1125, the CPU 301 sets the job status result to "transmission error", advances the processing to step S1121, outputs a "transmission error" in the print job history, and ends this processing. Also, in a case in which the timeout error has not occurred in step S1124, the processing proceeds to step S1115, and the CPU 301 continues to execute job data transmission.

In this way, when the CPU 301 in step S1115 determines that the transmission of the print data to the printer 101 ended, the processing proceeds to step S1117. In step S1117, the CPU 301 waits to receive, through the channel for communication established at the time of printer activation, notification of the print status from the printer 101. When the print status notification is received here, the processing proceeds to step S1118. In step S1118, the CPU 301 updates information of the number of pages for which printing was completed in the job status. Then, the processing proceeds to step S1119, and the CPU 301 determines whether or not print processing by the printer 101 ended. When it is determined that the print processing has not ended, the processing proceeds to step S1126, and, when it is determined that the print processing has ended, the processing proceeds to step S1120. In step S1120, the CPU 301 sets the job status to "normal output end", and in step S1121, outputs the job status in the job history, and ends this processing. Also, in step S1126, similarly to in the previously described step S1105, step S1122, and step S1123, it is determined whether or not a cancellation of a job that is currently being executed or is placed in the queue was performed. Then, in a case in which a cancellation instruction was made, the processing proceeds to step S1107. Otherwise, the processing proceeds to step S1117, and print status reception is awaited. Accordingly, it becomes possible to cancel a print job by an instruction by a user via the console unit 204 of the printer 101, and, in such a case, leave a job history by notifying the server 102 of that cancellation.

Figure 14:
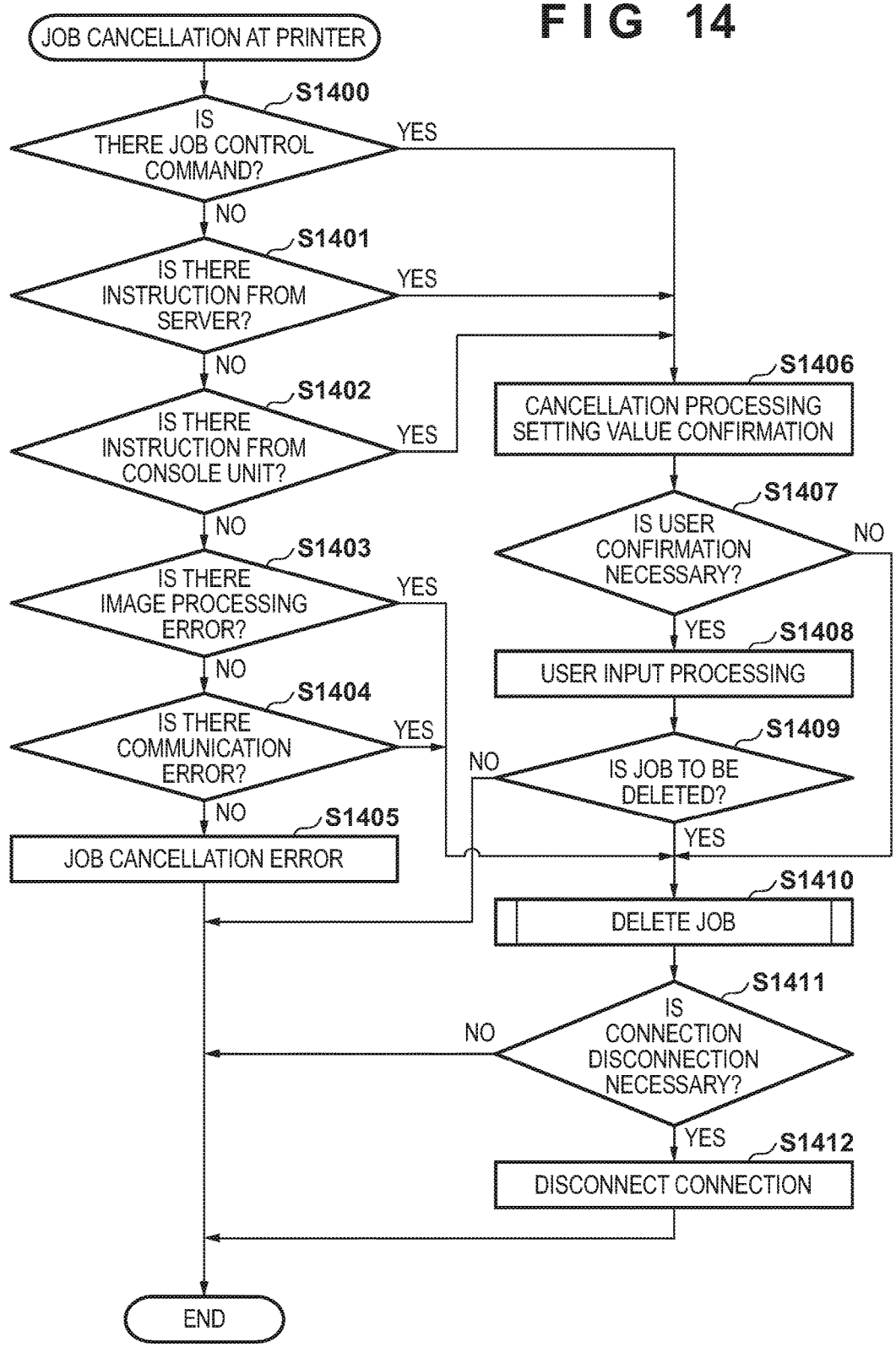
FIG. 14 is a flowchart for describing print job cancellation processing by the printer according to the embodiment.

FIG. 14 is a flowchart for describing print job cancellation processing by the printer 101 according to the embodiment. Also, the processing illustrated by this flowchart is achieved by the CPU 201 executing a program deployed into the RAM 202 from the HDD 203. This processing is started upon instruction of a reason for a job cancellation.

First, in step S1400, the CPU 201 determines whether or not there is a cancellation instruction according to a job control command, and if so, the processing proceeds to step S1406. If not, the processing proceeds to step S1401. The CPU 201 determines, in step S1401, whether or not there is a cancellation instruction from the server 102, and, if so, the processing proceeds to step S1406 If not, the processing proceeds to step S1402. The CPU 201 determines, in step S1402, whether or not there is a cancellation instruction according to an instruction from the console unit 204, and, if so, the processing proceeds to step S1406, and if not, the processing proceeds to step S1403. The CPU 201 in step S1403 determines whether or not there is an error that occurred in image processing on the received print data, and, if so, determines that continuation of the job processing is impossible, and the processing proceeds to step S1410. If not, the processing proceeds to step S1404. In step S1404, the CPU 201 determines whether or not an error occurred due to a communication error, and, if so, determines whether or not it is impossible to continue the job processing, and the processing proceeds to step S1410. When no error according to a communication error has occurred in step S1404, the processing proceeds to step S1405, and error processing as an error due to a job cancellation is performed. Here, whether or not the printer 101 deletes the job data depends on a setting value of the printer 101.

Also, in step S1406, the CPU 201 confirms the job cancellation setting value input on the screen for confirming job stoppage as illustrated in FIG. 13. Then the processing proceeds to step S1407, and, if user confirmation is necessary in the setting value, the CPU 201 receives input that accepts consent from the user in step S1408. Here, input of either the "YES" button 1302 or the "NO" button 1303 illustrated in FIG. 13 is received. When, in step S1409, the result is that the "YES" button 1302, in other words "stop printing", is instructed, the processing proceeds to step S1410. Otherwise, the job processing is continued after ending the cancellation processing. In step S1410, the CPU 201 deletes the job data and deletes the job associated data generated upon job reception. Then, the processing proceeds to step S1411, the CPU 201 determines whether or not it is necessary to disconnect the connection for communication with the server 102 that was established upon job reception, and, if connection disconnection is necessary, the processing proceeds to step S1412, and the connection for communication that became unnecessary is disconnected. Also, in a case in which disconnection of the connection for communication is not necessary, the processing is ended.

Figure 15:
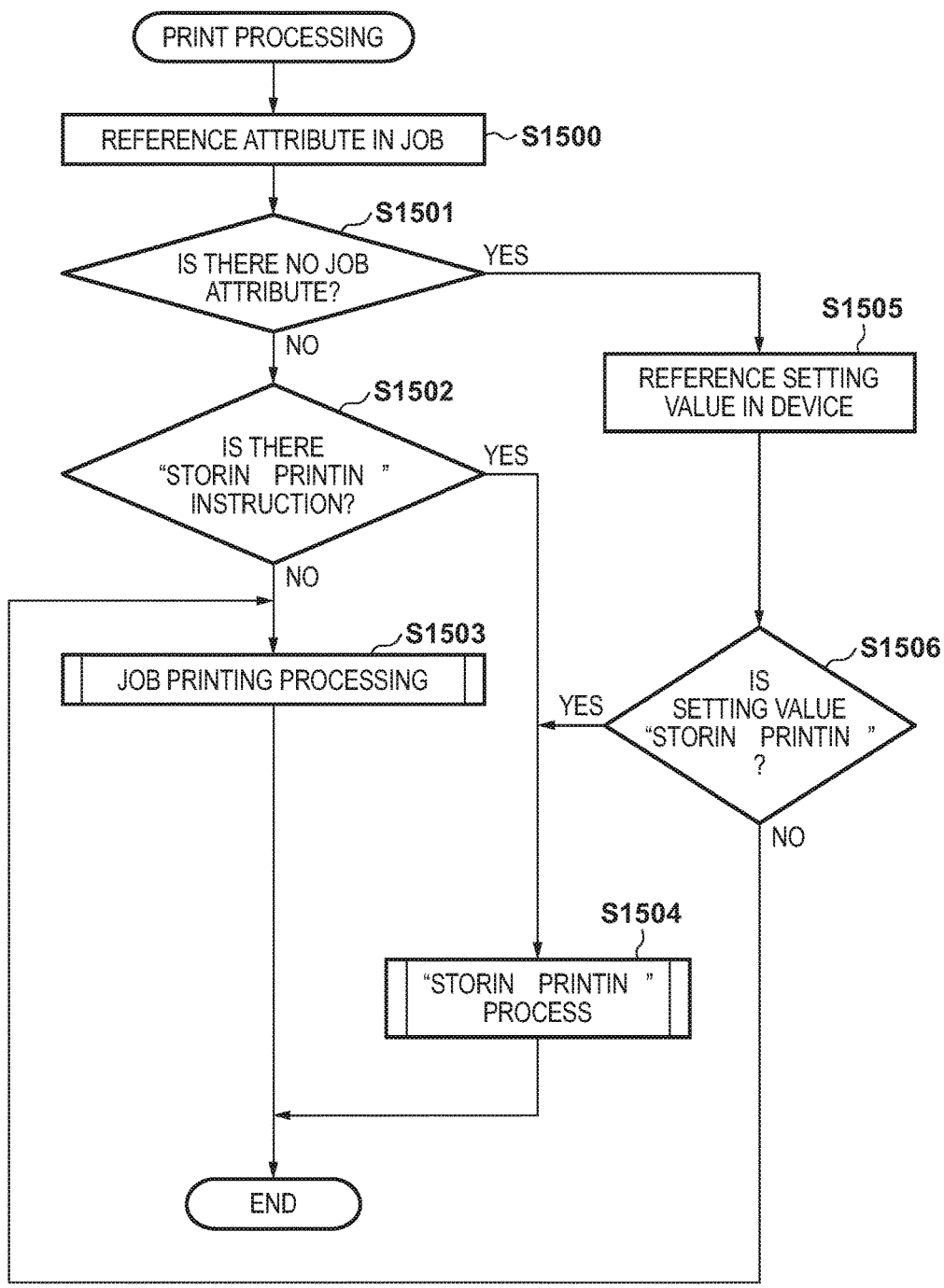
FIG. 15 is a flowchart for describing print job processing in the printer according to the embodiment.

FIG. 15 is a flowchart for describing print processing of the printer 101 according to the embodiment. Also, the processing illustrated by this flowchart is achieved by the CPU 201 executing a program deployed into the RAM 202 from the HDD 203. Here, there is a case of performing print processing to a sheet surface and a case of storing a job to the HDD 206 of the printer 101.

First, in step S1500, the CPU 201 references a job attribute of the received print data. Here, it is included in the attribute information whether to print the print data on a sheet or to store the job for later printing (store in the HDD 206 and perform printing later). Next, the processing proceeds to step S1501, and the CPU 201 determines whether or not the attribute is there. If the CPU 201 determines that the attribute is not there, the processing proceeds to step S1505, and a value set in advance in the printer 101 is referenced, and control is performed to use the set value.

When, in step S1502, the CPU 201 determines that "storing print job for later printing" is instructed by the job attribute, the processing proceeds to step S1504, the storing for later printing processing, in which the print data is stored in the HDD 206, is performed. Otherwise, the processing proceeds to step S1503, and printing on the sheet is performed in accordance with the print data.

Figure 16:
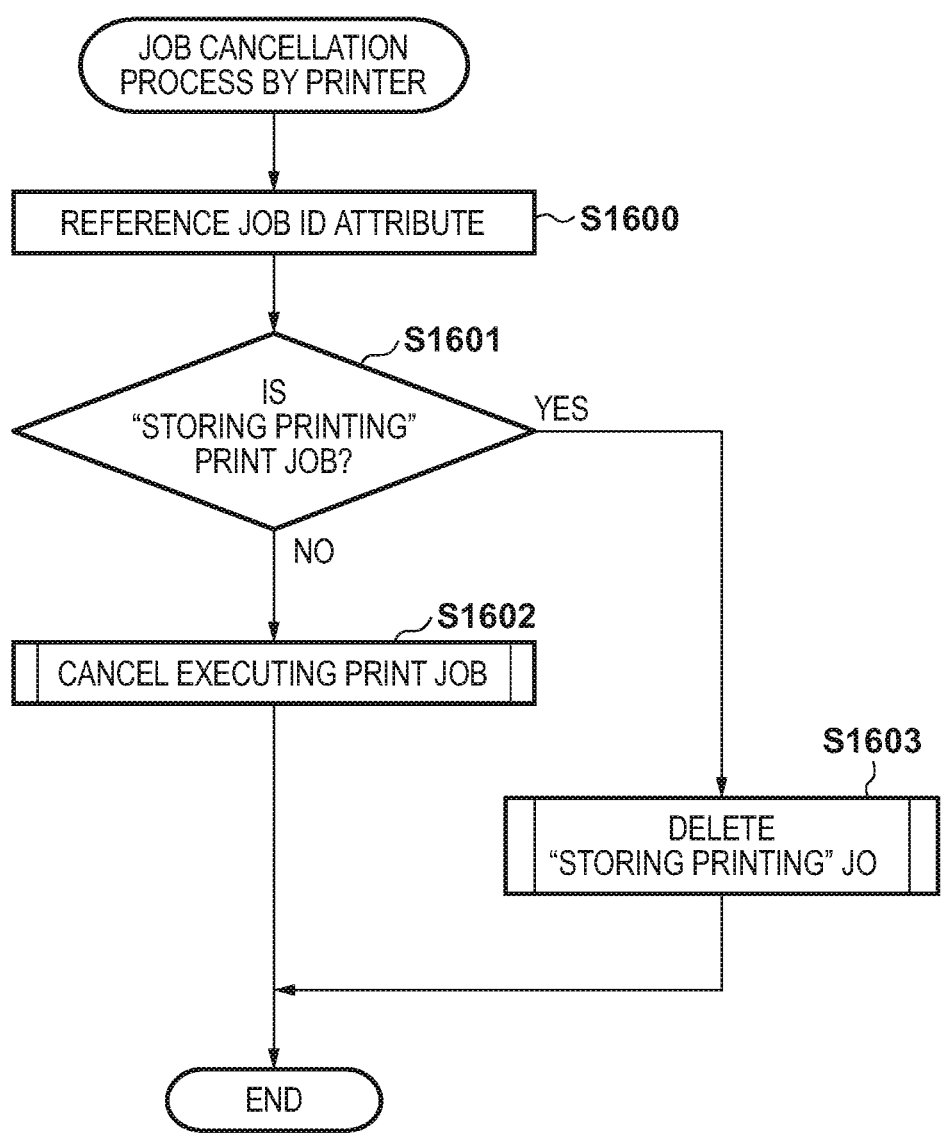
FIG. 16 is a flowchart for describing processing for cancelling a print job by the printer according to the embodiment.

FIG. 16 is a flowchart for describing processing for cancelling of a print job by the printer 101 according to the embodiment. Here, control including a case of a print job that instructs storage for later printing as described in FIG. 15 is illustrated.

First, in step S1600, the CPU 201 references the job attribute based on the job ID as associated data of a job added in the case of instructing job cancellation. Next, the processing proceeds to step S1601, and the CPU 201 determines whether or not the job for which the cancellation instruction was made is a "storing for later printing" print job. In a case in which it is determined that the print job was storing print job for later printing, the processing proceeds to step S1603, and the CPU 201 deletes the storing print job that was saved in the HDD 206, and ends this processing. More specifically, the job data of the storing print job that was stored in the HDD 206 of the printer 101 is deleted, and the various data, and the like, that was generated in association with the storing print job is deleted. Then, the print result that the storing print job that was stored is deleted is stored in a history. Meanwhile, when the CPU 201, in step S1601, determines that the storing print job is not cancelled, the processing proceeds to step S1602, and the print job that is currently being executed is stopped. Then, the job data of the print job that is currently being executed is deleted, the data generated in association with the print job is similarly deleted, processing to register the cancel result in the print history is executed, and this processing is ended.

By virtue of the embodiment as described above, it is possible to prevent a print result that a user does not intend when, in spite of the fact that a user of a client terminal cancelled a print job, the cancellation is not conveyed to the printer. Also, because of this, it is possible to prevent a print history that the user does not intend from being left.

Also, a printer, even after completion of print data reception from a server, can detect by a response from the server corresponding to a print status notification that the printing of the print data was cancelled by the server, and then the printer can cancel the printing of the print data.

OTHER EMBODIMENTS

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A print system for causing print data, input by a user, to be printed by a printer via a server, the print system comprising:
    (A) the printer that includes:
        (a) a first memory device that stores a set of instructions; and
        (b) at least one first processor that executes instructions, of the set of instructions stored in the first memory device:
            (i) to download, from the server, the print data in accordance with an existence notification for the print data from the server; and
            (ii) to perform, in accordance with one of (1) an instruction according to the print data, and (2) a setting value of the printer that is set in advance, one of (i-i) storing of the downloaded print data into a non-volatile memory to be printed, and (i-ii) immediate printing of the downloaded print data; and
    (B) the server that includes:
        (a) a second memory device that stores a set of instructions; and
        (b) at least one second processor that executes instructions, of the set of instructions stored in the second memory device to (i) transmit, in a case that a cancellation instruction for cancelling printing of the print data is received from the user, the cancellation instruction to the printer, (ii) to record cancellation of a print job, including the print data, in a print history, and (iii) to disconnect communication with the printer,
    wherein the at least one first processor of the printer further executes the instructions, of the set of instructions stored in the first memory device:
        (iii) to cancel print processing in accordance with receiving the cancellation instruction from the server;
        (iv) to delete, in a case in which the printer receives the cancellation instruction from the server, the downloaded print data; and
        (v) to record the cancellation of the print job in the print history.

2. The print system according to claim 1, wherein the print data includes identification information for identifying the print data,
    wherein the at least one second processor further executes the instructions stored in the second memory device (iv) to delete corresponding print data stored in the server in accordance with receiving the cancellation instruction from the user, and
    wherein the at least one first processor further executes the instructions stored in the first memory device (vi) to cancel the print processing in accordance with a notification of an error from the server that is made in a case in which print data, corresponding to the identification information of the print data included in a notification of a print status transmitted to the server from the printer, is not stored on the server.

3. The print system according to claim 1, wherein the at least one first processor further executes the instructions stored in the first memory device (vi) to cancel the print processing in accordance with receiving the cancellation instruction from the server before downloading of the print data completes, and, after the downloading of the print data has completed, the print processing is cancelled in accordance with a notification of an error from the server corresponding to a notification of a print status transmitted to the server from the printer.

4. The print system according to claim 2, wherein the notification of the print status is performed for one of (1) every time the printer prints a predetermined number of pages, and (2) each predetermined time period, and the notification of the print status includes identification information for identifying the print data.

5. The print system according to claim 1, wherein the at least one first processor further executes the instructions stored in the first memory device (vi) to allow the user to select whether or not to cancel the print processing in accordance with receiving the cancellation instruction from the server.

6. A printer for receiving print data, input by a user via a server, the printer comprising:
    (A) a memory device that stores a set of instructions; and
    (B) at least one processor that executes instructions, of the set of instructions stored in the memory device, to function as:
        (a) a reception unit configured to transmit, to the server, a data request in accordance with an existence notification for the print data from the server, and to receive the print data;
        (b) a printing unit configured to perform printing based on the print data;
        (c) a cancelling unit configured to cancel, in a case that a cancellation instruction corresponding to print processing of the print data is received from the server during reception of the print data by the reception unit, the print processing based on the print data; and
        (d) a storing unit configured to store the print data,
        wherein, in accordance with one of (i) an instruction according to the print data, and (ii) a setting value of the printer that is set in advance, the at least one processor performs one of (1) storing, as the storing unit, the downloaded print data into a non-volatile memory to be printed, and (2) immediate printing, as the printing unit, of the downloaded print data, and, in accordance with receiving the cancellation instruction from the server, deleting the downloaded print data.

7. The printer according to claim 6, wherein the reception unit is configured to receive a notification of an error from the server, the notification being made in a case in which print data, corresponding to the identification information of the print data included in a notification of a print status transmitted to the server from the printer, is not stored on the server.

8. The printer according to claim 7, wherein the notification of the print status is performed for one of (1) every time the printer prints a predetermined number of pages, and (2) each predetermined time period, and the notification of the print status includes identification information for identifying the print data.

9. The printer according to claim 6, wherein the at least one processor further executes the instructions, of the set of instructions stored in the memory device, to function as (e) a selection unit configured to allow the user to select whether or not to cancel the print processing in accordance with receiving the cancellation instruction.

10. A method of controlling a printing system for causing print data, input by a user, to be printed by a printer via a server, the method comprising:

transmitting, from the server to the printer, an existence notification for print data that indicates the existence of the input print data;

downloading, from the server to the printer, the print data in accordance with the printer received the existence notification for the print data from the server;

transmitting, in a case that a cancellation instruction for cancelling printing of the print data is received from the user, the cancellation instruction from the server to the printer, and recording, in the server, cancellation of a print job, including the print data, in a print history;

cancelling, in the printer, print processing in accordance with receiving the cancellation instruction from the server, and recording cancellation of the print job in the print history;

performing, in accordance with one of (a) an instruction according to the print data, and (b) a setting value that is set in advance, in the printer, one of (i) storing of the downloaded print data into a non-volatile memory to be printed, and (ii) immediate printing of the downloaded print data; and deleting, in accordance with receiving the cancellation instruction from the server, the downloaded print data in the printer.

11. A method of controlling a printer for receiving print data via a server, the method comprising:

transmitting, to the server, a data request in accordance with an existence notification for the print data from the server, and receiving the print data;

performing printing based on the print data;

cancelling, in a case that a cancellation instruction corresponding to print processing of the print data is received from the server during reception of the print data, the print processing based on the print data;

performing, in accordance with one of (a) an instruction according to the print data, and (b) a setting that is set in advance, one of (i) storing the downloaded print data into a non-volatile memory to be printed, and (ii) immediate printing the downloaded print data without storing the downloaded print data; and deleting, in accordance with receiving the cancellation instruction, the downloaded print data.

12. A non-transitory computer-readable storage medium storing a program for causing a processor to execute a method of controlling a printer for receiving print data via a server, the method comprising:

transmitting, to the server, a data request in accordance with an existence notification for the print data from the server, and receiving the print data;

performing printing based on the print data;

cancelling, in a case that a cancellation instruction corresponding to print processing of the print data is received from the server during reception of the print data, the print processing based on the print data;

performing, in accordance with one of (a) an instruction according to the print data, and (b) a setting that is set in advance, one of (i) storing the downloaded print data into a non-volatile memory to be printed, and (ii) immediate printing the downloaded print data; and deleting, in accordance with receiving the cancellation instruction, the downloaded print data.

* * * * *